United States Patent [19]

Marshall

[11] 4,227,312
[45] Oct. 14, 1980

[54] DRILL SHARPENING GAUGE

[76] Inventor: Wilbur A. Marshall, Rt. 2, Box 96 C., Aurora, Mo. 65605

[21] Appl. No.: 80,707

[22] Filed: Oct. 1, 1979

[51] Int. Cl.³ .................... G01B 5/02; B27G 23/00; B23B 3/00
[52] U.S. Cl. .................................................. 33/201
[58] Field of Search .................. 33/201, 185 R, 199 B

[56] References Cited

U.S. PATENT DOCUMENTS

| | | | |
|---|---|---|---|
| 51,248 | 11/1865 | Wells | 33/201 |
| 464,290 | 12/1891 | Taylor | 33/201 |
| 1,506,618 | 8/1924 | Durham | 33/201 |
| 2,547,284 | 4/1951 | Rabuck | 33/201 |
| 2,778,122 | 1/1957 | Oleksin | 33/201 |
| 2,840,921 | 7/1958 | Swanson | 33/201 |
| 3,184,860 | 5/1965 | Garrison | 33/201 |
| 3,838,521 | 10/1974 | Peterson | 33/201 |

*Primary Examiner*—William D. Martin, Jr.
*Attorney, Agent, or Firm*—Merlin B. Davey

[57] ABSTRACT

This invention relates to a drill sharpening gauge which can be positioned close to an abrasive motor-driven wheel so that the operator can quickly check the length of the edges of the drill bit at the tip of the drill to insure that both edges are the same length and thus the angles are equal, and with present manufacturing technology the drill sharpening gauge of this invention is one that can be easily and economically made.

4 Claims, 3 Drawing Figures

U.S. Patent      Oct. 14, 1980      4,227,312
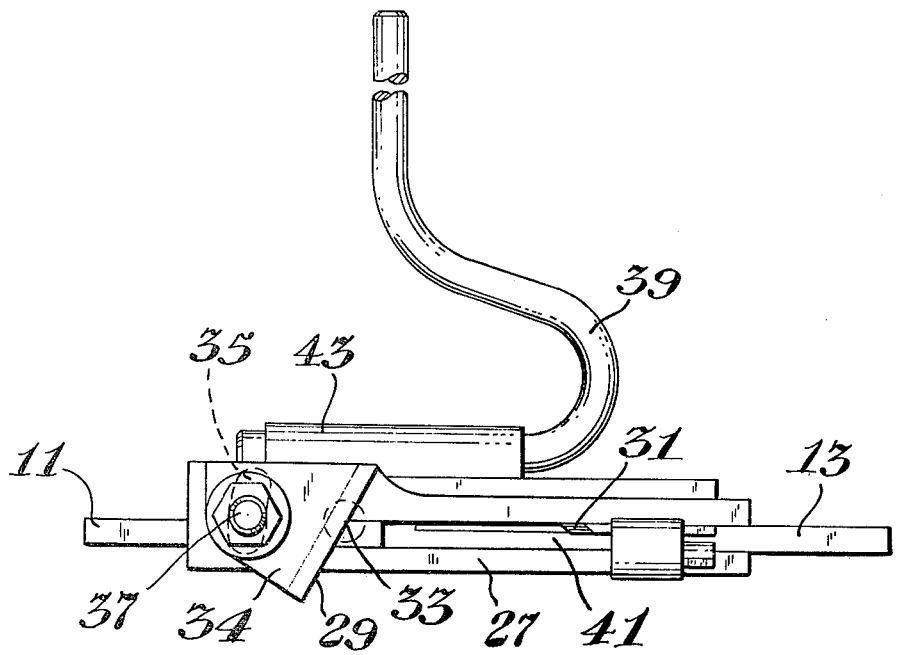
Fig. 2
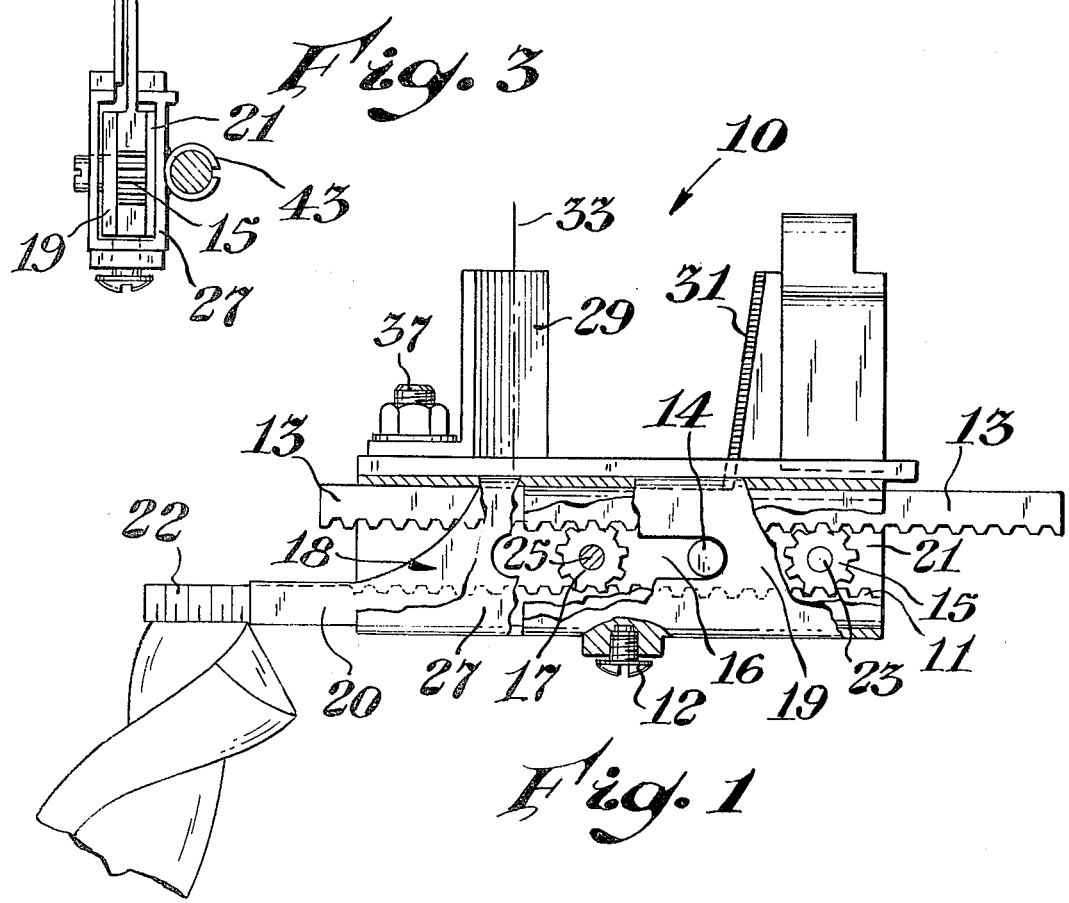
Fig. 3
Fig. 1

DRILL SHARPENING GAUGE

BACKGROUND OF THE INVENTION

When sharpening drill bits, such as with an abrasive wheel, it is essential that, for a given size drill, both edges are angled away from the tip at the same angle so that the drill will cut into the workpiece straight and true.

Various tool gauges have been described in the art, such as, for example, in U.S. Pat. Nos. 2,778,122; 2,547,284; 1,506,618 and 51,248. None of these previously described gauges provide a means whereby the cutting edge of a tool can be checked with a measured section of a scale without using at least one hand to pick up and hold the gauge.

SUMMARY OF THE INVENTION

This invention provides a drill point gauge (10) comprising a first rack (11) and a second rack (13), said racks being opposed and cooperatively engaging two pinions (15, 17) spaced apart in the same plane and positioned in a rectangular carriage (18), comprising two opposed plates (19, 21), said pinions being individually mounted between said plates on individual stationary axes (23, 25) affixed between said plates and being adapted to rotate on said axes in cooperation with a stationary and a moving rack; said carriage, pinions and racks being positioned in a rectangular housing (27), having a bumper blade (29) affixed thereto at a preferred angle of 59° from the longitudinal axes thereof, said first rack (11) being held stationary in said housing and said second rack (13) and said carriage (18) being movable with respect to said housing (27) and said first rack (11), said first rack (11) having an extended end portion (22) without teeth and said plate (19) having an extended finger portion (20) operating parallel and adjacent to portion (22) of rack (11), said second rack (13) being adapted to move a jaw blade (31) which is adapted to cooperate with said bumper blade (29) to measure the width of a drill at a given angle while said extended finger portion (20) measures the length of one cutting edge of said drill on said extended end portion (22). A novel feature of this invention is the easy way of indicating on a scale the length of the cutting edge of a drill.

DESCRIPTION OF THE DRAWINGS

The invention will be further understood by reference to the accompanying drawing, wherein FIG. 1 is a side view, with portions cut away of a portion of the drill point gauge of this invention;

FIG. 2 is a top view of the housing and mounting arm of the drill point gauge, and FIG. 3 is an end view taken from the right side of FIG. 1.

Referring to FIG. 1, the drill point gauge of this invention comprises a first rack (11) and a second rack (13), said racks being opposed and cooperatively engaging two pinions (15, 17) spaced apart in the same plane and positioned in a rectangular carriage (18), comprising two opposed plates (19,21), said pinions being individually mounted between said plates on individual stationary axes (23, 25) affixed between said plates and being adapted to rotate on said axes in cooperation with a stationary and a moving rack; said carriage, pinions and racks being positioned in a rectangular housing (27), having an adjustable bumper blade (29) affixed thereto at any desired angle from the longitudinal axes thereof, said first rack (11) being held stationary in said housing and said second rack (13) and said carriage (18) being movable with respect to said housing (27) and said first rack (11), said first rack (11) having an extended end portion (22) without teeth and displaying a measuring section, and said plate (19) having an extended finger portion (20) operating parallel and adjacent to portion (22) of rack (11), said second rack (13) being adapted to move a jaw blade (31) which is adapted to cooperate with said bumper blade (29) to measure the width of a drill at a given angle while said extended finger portion (20) measures the length of one cutting edge of said drill on said extended end portion (22).

As shown in FIG. 1, set screw (12) is utilized to hold first rack (11) stationary in said housing (27), and pin (14) in slot (16) of said housing (27) affixed to carriage (18), limits the travel of carriage (18) and consequently rack (13) to the right or left, as desired, to measure the diameter of the drill when set between bumper blade (29) and movable blade (31). In the arrangement shown, rack (13) moves twice as fast as carriage (18) and thus the distance between extended portion (20) and the end of rack (11) will always be the length of one cutting edge of a drill which is placed between blades (29) and (31).

As best seen in FIG. 2, movable blade (31) travels in groove (41) in the top of housing (27) and the angle of bumper blade (29) with respect to movable blade (31) may be altered as desired by simple rotation around axis pin (33). Bumper blade (29) displays both a pin type extension (33) turnably inserted into housing (27) and a backwardly extending portion (34) having a curved slot (35). Said movement is made possible by said slot (35) and stud bolt (37) which is threaded and nutted as shown and which serves to lock blade (29) in a set position when desired. Regardless of the angle, however, the vertical axis of blade (29) will always be in alignment with movable blade (31) as illustrated in FIG. 2. Allowance for the web thickness of a drill to be sharpened is made by having a slightly backward slanting edge on movable blade (31) as seen in FIg. 1. As shown in FIG. 1, larger drills will have a larger web thickness.

As shown in FIG. 2, the drill sharpening gauge of this invention may be mounted by means of a mounting arm (39), which is similar to that described in my co-pending application Ser. No. 9,662 filed Feb. 5, 1979 and may be attached to the side of drill point gauge (10) by means of mounting fixture (43).

As seen in FIG. 3, movable blade (31) may be a simple extension off from movable rack (13), i.e., it may be one piece with the movable rack. Alternatively, blade (31) may be made separately and be press-fitted into a groove or slot in the top of rack (13). Blade (31) is movable by a simple squeezing of the two portions together. Release of the applied pressure allows the natural spring tension of the materials to form a friction set and maintain blade (31) in the position it is left in, as seen in FIG. 3.

The drawings are illustrative only and various modifications may be made in the present invention without departing from the spirit or scope thereof, and it is understood that I limit myself only as defined in the appended claims.

I claim:

1. A drill point gauge comprising a first rack and a second rack, said racks being opposed and cooperatively engaging two pinions spaced apart in the same place and positioned in a rectangular carriage, comprising two opposed plates, said pinions being individually mounted between said plates on individual stationary axes affixed between said plates and being adapted to rotate on said axes in cooperation with a stationary and a moving rack; said carriage, pinions and racks being positioned in a rectangular housing, having a bumper blade adjustably affixed thereto at any desired angle from the longitudinal axes thereof, said first rack being held stationary in said housing and said second rack and said carriage being movable with respect to said housing and said first rack, said first rack having an extended end portion without teeth and displaying a measuring section and one plate having an extended finger portion operating parallel and adjacent to a portion of the first rack, said second rack being adapted to move a jaw blade which is adapted to cooperate with said bumper blade to measure the width of a drill at a given angle while said extended finger portion measures the length of one cutting edge of said drill on said extended end portion.

2. Gauge of claim 1 wherein said bumper blade is rotatably centered on an off set pin and may be locked in position by locking means.

3. Gauge of claim 1 wherein a movable and lockable jaw blade has a thin edge cooperating with the face of a rotable bumper blade.

4. Gauge of claim 3 wherein the edge of the jaw blade cooperating with the face of the bumper blade is slanted away from the face of the bumper blade.

* * * * *